(12) United States Patent
Wong et al.

(10) Patent No.: US 11,777,690 B2
(45) Date of Patent: *Oct. 3, 2023

(54) TERMINAL DEVICE, INFRASTRUCTURE EQUIPMENT AND METHODS

(71) Applicants: Sony Corporation, Tokyo (JP); Sony Mobile Communications Inc., Tokyo (JP)

(72) Inventors: Shin Horng Wong, Basingstoke (GB); Martin Warwick Beale, Basingstoke (GB); Basuki Priyanto, Lund (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 17/206,146

(22) Filed: Mar. 19, 2021

(65) Prior Publication Data
US 2021/0211261 A1 Jul. 8, 2021

Related U.S. Application Data

(63) Continuation of application No. 16/079,238, filed as application No. PCT/EP2017/055341 on Mar. 7, 2017, now Pat. No. 10,958,399.

(30) Foreign Application Priority Data

Mar. 11, 2016 (EP) .................................. 16160019
Apr. 11, 2016 (EP) .................................. 16164756

(51) Int. Cl.
*H04L 5/00* (2006.01)
*H04W 4/70* (2018.01)
(Continued)

(52) U.S. Cl.
CPC .......... *H04L 5/0055* (2013.01); *H04L 1/1664* (2013.01); *H04L 1/1812* (2013.01);
(Continued)

(58) Field of Classification Search
CPC ... H04L 5/0055; H04L 1/1664; H04L 1/1812; H04L 1/1822; H04L 5/0053;
(Continued)

(56) References Cited

U.S. PATENT DOCUMENTS 8,929,282 B2  1/2015  Wu
9,065,545 B2  6/2015  Earnshaw et al.
(Continued)

OTHER PUBLICATIONS

Way Forward on NB-IoT, CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Ho, CATT, u-blox, China Unicorn, LG Electronics, Panasonic, Alcatel-Lucent, Alcatel-Lucent Shanghai Bell, China Telecom, R1-157783, 3GPP TSG RAN WG1 #83, Anaheim, USA, Nov. 15-22, 2015, pp. 1-3.
(Continued)

*Primary Examiner* — Ayaz R Sheikh
*Assistant Examiner* — Tarell A Hampton
(74) *Attorney, Agent, or Firm* — XSENSUS LLP

(57) ABSTRACT

A terminal device for use with a wireless telecommunications network, the terminal device comprising: transceiver circuitry configured to receive data from the wireless telecommunications network, and a controller configured: to control the transceiver circuitry to receive control information, a control channel and a data channel wherein, the control information defines the period of time between the control channel and the data channel, and to ignore a subsequent control channel received during the period of time following the control channel.

18 Claims, 11 Drawing Sheets

(51) Int. Cl.
*H04L 1/1812* (2023.01)
*H04L 69/28* (2022.01)
*H04L 1/1822* (2023.01)
*H04L 1/1607* (2023.01)
*H04W 72/23* (2023.01)

(52) U.S. Cl.
CPC .......... *H04L 1/1822* (2013.01); *H04L 5/0053* (2013.01); *H04L 5/0064* (2013.01); *H04L 5/0078* (2013.01); *H04L 5/0092* (2013.01); *H04L 69/28* (2013.01); *H04W 4/70* (2018.02); *H04W 72/23* (2023.01); *H04L 5/0044* (2013.01)

(58) Field of Classification Search
CPC ... H04L 5/0064; H04L 5/0078; H04L 5/0092; H04L 69/28; H04L 5/0044; H04W 4/70; H04W 72/042
See application file for complete search history.

(56) References Cited

U.S. PATENT DOCUMENTS

| | | | |
|---|---|---|---|
| 9,900,874 | B2 | 2/2018 | Kawasaki |
| 10,425,196 | B2 | 9/2019 | You et al. |
| 2007/0223405 | A1 | 9/2007 | Jiang et al. |
| 2010/0331037 | A1 | 12/2010 | Jen |
| 2011/0292854 | A1 | 12/2011 | Terry et al. |
| 2014/0029565 | A1 | 1/2014 | Kim et al. |
| 2014/0044056 | A1 | 2/2014 | Chen et al. |
| 2014/0204856 | A1 | 7/2014 | Chen et al. |
| 2014/0376486 | A1 | 12/2014 | Lee et al. |
| 2015/0016310 | A1 | 1/2015 | Yi et al. |
| 2015/0181464 | A1 | 6/2015 | Lee et al. |
| 2015/0263829 | A1 | 9/2015 | Nguyen et al. |
| 2016/0007357 | A1 | 1/2016 | Yano et al. |
| 2016/0057737 | A1 | 2/2016 | Kim |
| 2016/0095137 | A1 | 3/2016 | Chen et al. |
| 2016/0105882 | A1 | 4/2016 | Park et al. |
| 2016/0119840 | A1 | 4/2016 | Loehr et al. |
| 2016/0127918 | A1 | 5/2016 | Yi et al. |
| 2016/0219546 | A1 | 7/2016 | Ahn et al. |
| 2016/0270116 | A1 | 9/2016 | Lin et al. |
| 2016/0295345 | A1 | 10/2016 | Oh |
| 2017/0013565 | A1 | 1/2017 | Pelletier et al. |
| 2017/0019897 | A1 | 1/2017 | Bennett et al. |
| 2017/0034850 | A1 | 2/2017 | Rico Alvarino et al. |
| 2017/0202008 | A1 | 7/2017 | Nader et al. |
| 2017/0202054 | A1 | 7/2017 | Rathonyi et al. |
| 2017/0208490 | A1 | 7/2017 | Lu et al. |
| 2017/0273027 | A1 | 9/2017 | Kim et al. |
| 2017/0290017 | A1 | 10/2017 | Takeda et al. |
| 2017/0303248 | A1 | 10/2017 | Chatterjee et al. |
| 2018/0013529 | A1 | 1/2018 | You et al. |
| 2018/0049164 | A1 | 2/2018 | Wu et al. |
| 2018/0076924 | A1 | 3/2018 | Lee et al. |
| 2018/0077696 | A1 | 3/2018 | Lee et al. |
| 2018/0098239 | A1 | 4/2018 | You et al. |
| 2018/0145819 | A1 | 5/2018 | Axmon et al. |
| 2018/0254860 | A1 | 9/2018 | Wong et al. |
| 2018/0279366 | A1 | 9/2018 | Harada et al. |
| 2018/0316464 | A1 | 11/2018 | Stern-Berkowitz et al. |
| 2018/0332566 | A1 | 11/2018 | You et al. |
| 2018/0367278 | A1 | 12/2018 | Chatterjee et al. |
| 2018/0376451 | A1 | 12/2018 | Wong |
| 2019/0021131 | A1 | 1/2019 | Zhang et al. |
| 2019/0028221 | A1* | 1/2019 | Ratasuk ............... H04L 5/0053 |
| 2019/0037637 | A1 | 1/2019 | Suzuki et al. |
| 2019/0037640 | A1 | 1/2019 | Xiong et al. |
| 2019/0045525 | A1 | 2/2019 | Shi et al. |
| 2019/0053257 | A1 | 2/2019 | Zhu et al. |
| 2019/0069164 | A1 | 2/2019 | Kishiyama et al. |

OTHER PUBLICATIONS

Holma, H. and Toskala, A., "LTE for UMTS: OFDMA and SC-FDMA Based Radio Access," First published: Mar. 31, 2009, Copyright © 2009 John Wiley & Sons, Ltd,Print ISBN:9780470994016, pp. 1-8.

Huawei, Hisilicon, Neul, "Timing Relationships," R1-160326, 3GPP TSG RAN WGl Meeting #84, St Julian's, Malta, Feb. 15-19, 2016, pp. 1-6.

Intel Corporation, "NB-IoT Downlink Control Channel Design," R1-160127, 3GPP TSG RAN WG1 NB-IoT Ad-Hoc Meeting, Budapest, Hungary, Jan. 18-20, 2016, pp. 1-5.

Intel Corporation, "Timing Relationships for NB-IoT," R1-160417, 3GPP TSG RAN WG1 Meeting #84, St Julian's, Malta, Feb. 15-19, 2016, pp. 1-5.

Mediatek Inc., "Discussion on scheduling timing for NB-IOT," R1-160162, 3GPP TSG-RAN WGl NB-IOT Ad-Hoc Meeting, Budapest, Hungary, Jan. 18-20, 2016, pp. 1-5.

Qualcomm Incorporated, "New Work Item: NarrowBand IOT NB-IOT," RP-151621, 3GPP TSG RAN Meeting #69, Phoenix, USA, Sep. 14-16, 2015, pp. 1-9.

Wi Rapporteur (Ericsson), "RAN1 agreements for Rel-13 NB-IoT," R1-161548, 3GPP TSG-RAN WG1 Meeting #84, St. Julian's, Malta, Feb. 15-19, 2016, pp. 1-11.

International Search Report and Written Opinion for International Application No. PCT/EP2017/055341 dated Jul. 21, 2017.

* cited by examiner

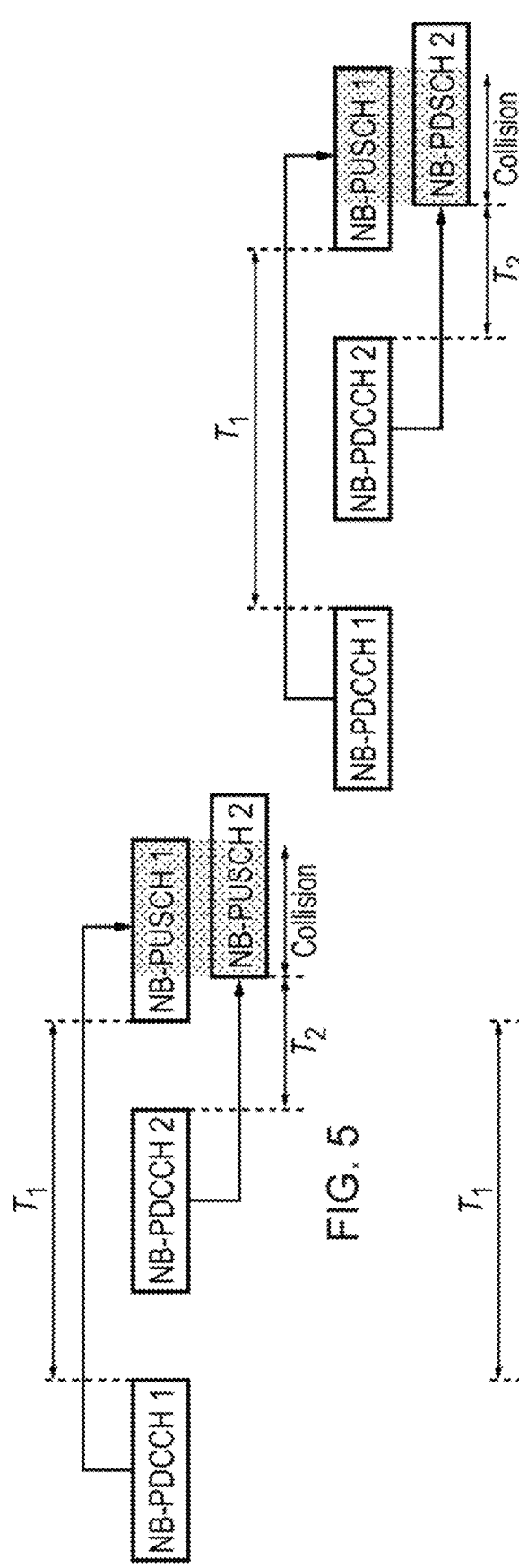
FIG. 5
FIG. 6
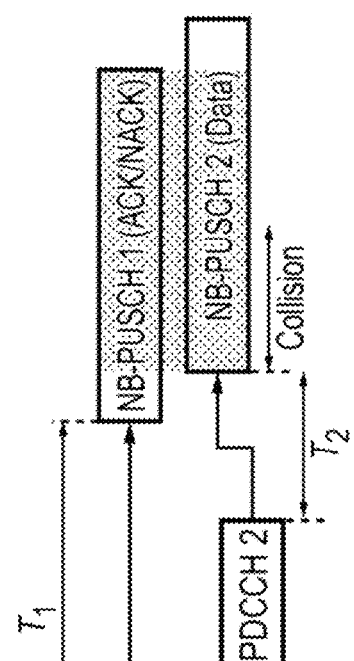
FIG. 7
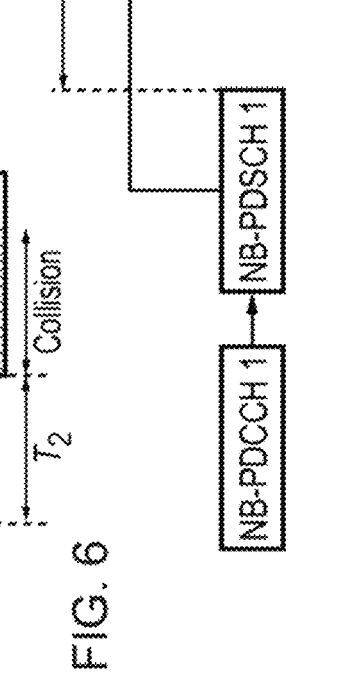
FIG. 8

TERMINAL DEVICE, INFRASTRUCTURE EQUIPMENT AND METHODS

CROSS-REFERENCE TO RELATED APPLICATIONS

This application is a continuation of U.S. application Ser. No. 16/079,238, filed Aug. 23, 2018, which is a National Stage Application based on PCT/EP2017/055341, filed on Mar. 7, 2017, and claims priority to European Patent Application Nos. 16160019.2, filed on Mar. 11, 2016, and 16164756.5, filed on Apr. 11, 2016, the entire contents of each are incorporated herein by its reference.

BACKGROUND

Field of Disclosure

The present disclosure relates to a terminal device, infrastructure equipment, methods and integrated circuitry.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

There is provided a terminal device for use with a wireless telecommunications network, the terminal device comprising: transceiver circuitry configured to receive data from the wireless telecommunications network, and a controller configured: to control the transceiver circuitry to receive control information, a control channel and a data channel wherein, the control information defines the period of time between the control channel and the data channel, and to ignore a subsequent control channel received during the period of time following the control channel.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 5 illustrates a collision between two NB-PUSCH carrying data;

FIG. 6 illustrates a collision between two NB-PDSCH;

FIG. 7 illustrates a collision between NB-PUSCH and NB-PDSCH;

FIG. 8 illustrates a collision between an NB-PUSCH carrying Uplink Control Information and an NB-PUSCH carrying data;

DETAILED DESCRIPTION OF THE EMBODIMENTS

Conventional Communications System

Figure 1:
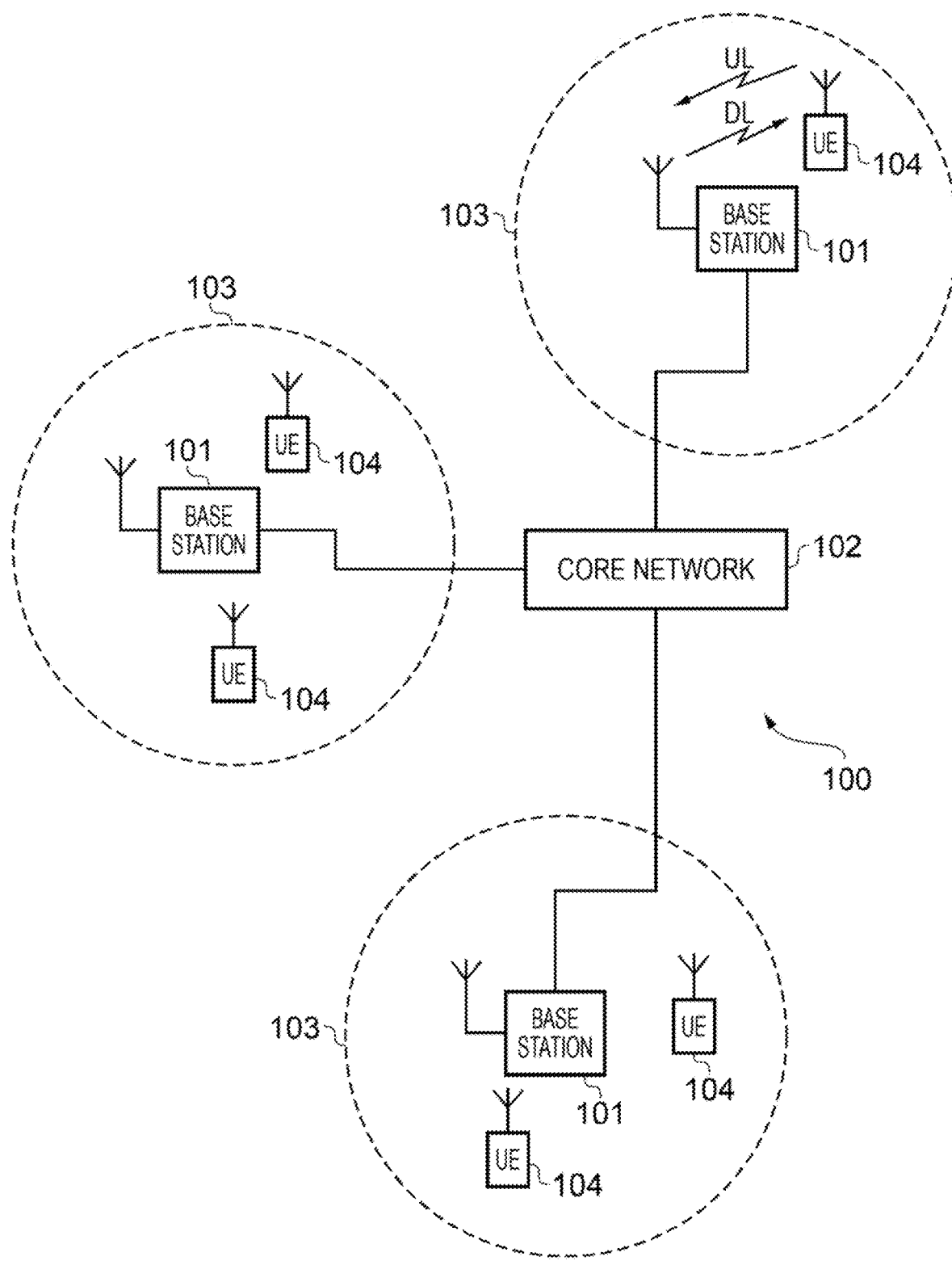
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. A communications device may also be referred to as a mobile station, user equipment (UE), user device, mobile radio, terminal device and so forth. A base station may also be referred to as a transceiver station, NodeB, eNodeB (eNB for short), infrastructure equipment and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
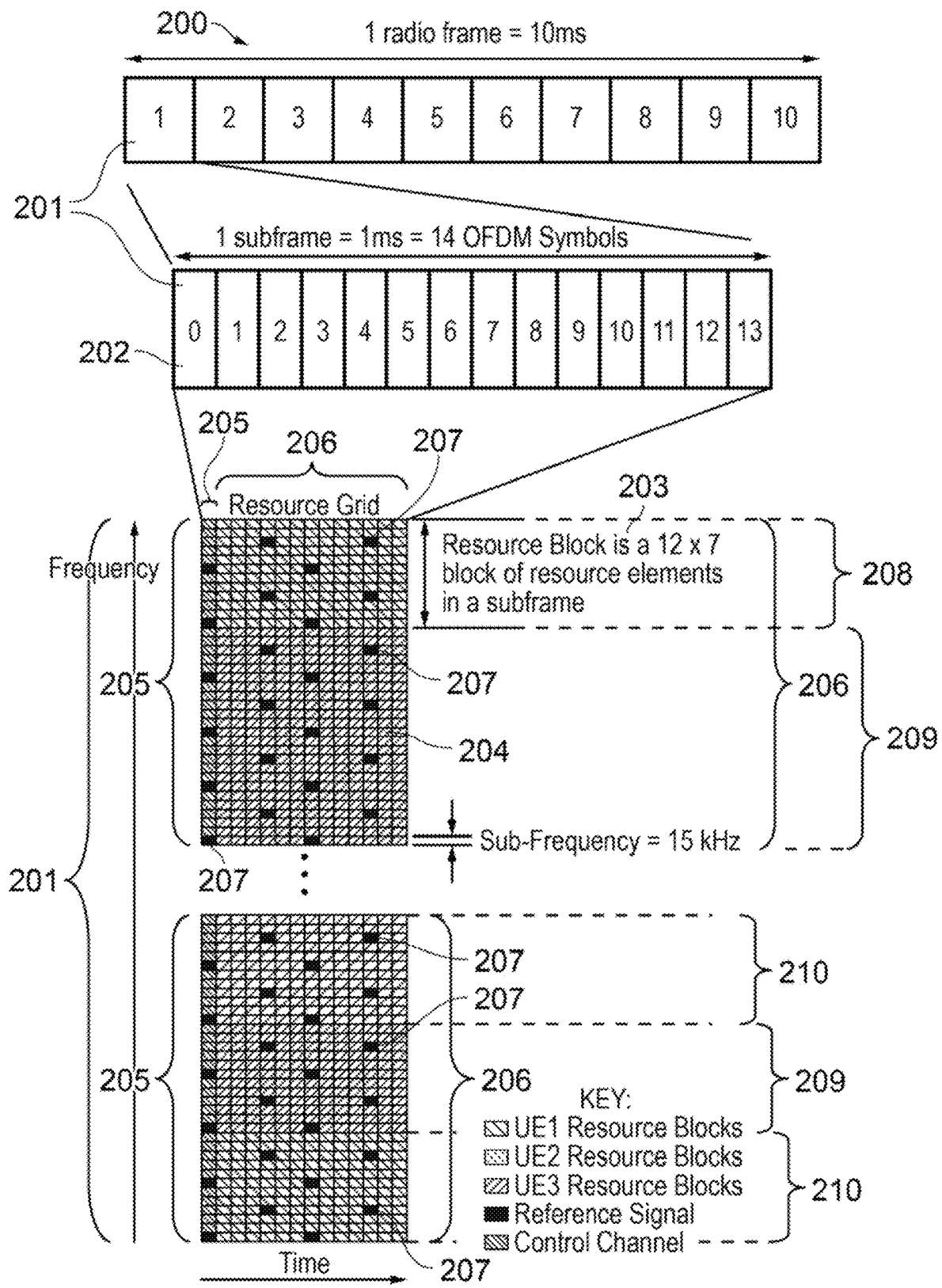
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into 128 to 2048 orthogonal subcarriers for example. Each subcarrier bandwidth may take any value but in LTE it is conventionally fixed at 15 kHz. However it has been proposed in the future [2] [3] to provide also a reduced subcarrier spacing of 3.75 kHz for certain parts of the LTE wireless access interface for either the uplink or the downlink or both. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
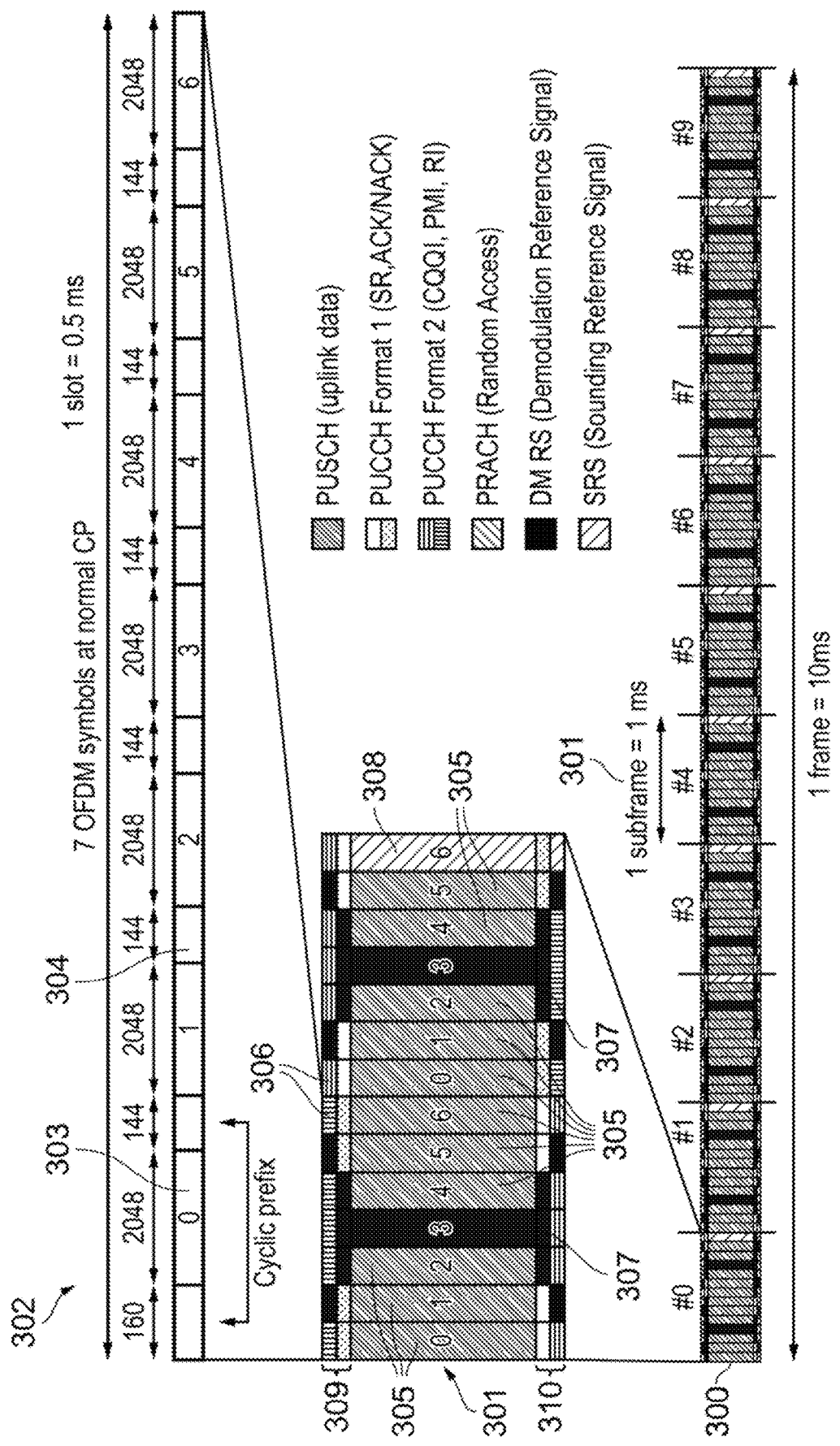
FIG. 3 is a schematic representation illustrating a frame structure of an up-link of a wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes. More details of the LTE up-link represented in FIG. 3 are provided in Annex 1.

Narrowband Internet of Things

Figure 4:
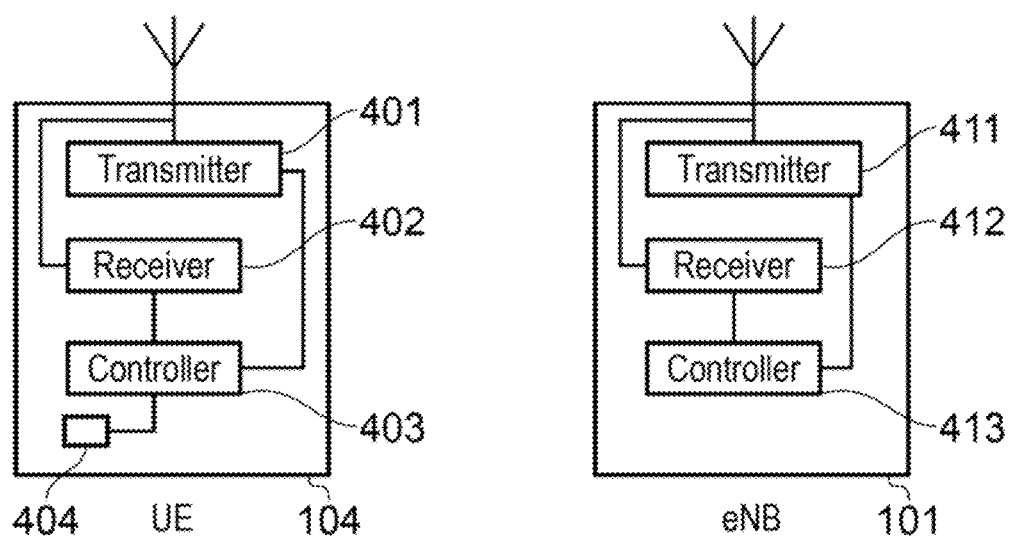
FIG. 4 is a schematic block diagram of a communications device and an infrastructure equipment.

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) wireless access interface was agreed [2]. This project is aimed at improved indoor coverage, support for a massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilizing for example the spectrum currently being used by GERAN systems as a replacement of one or more GSM carriers
2. 'Guard band operation' utilizing the unused resource blocks within a LTE carrier's guard-band
3. 'In-band operation' utilizing resource blocks within a normal LTE carrier FIG. 4 provides an example schematic block diagram of a terminal device or UE 104 and a infrastructure equipment or eNB 101. As shown in FIG. 4, the UE 104 includes a transmitter 401 and a receiver 402 (which together form a transceiver) which are controlled by a controller 403. Correspondingly, the eNB 101 includes a transmitter 411 and a receiver 412 (which together form a transceiver) which are controlled by a controller 413 (which can also implement a scheduler function). As explained above, the UE 104 transmits and receives signals to and from the eNB 101 via a wireless access interface provided by the eNB as part of the wireless communications network. Each of the UE 104 and eNB 101 are configured to exchange signals with each other using NB-IoT.

In LTE, the Physical Downlink Control Channel (PDCCH) and Enhanced Physical Downlink Control Channel (EPDCCH) are downlink control channels used to schedule Physical Downlink Shared Channel (PDSCH) and Physical Uplink Shared Channel (PUSCH) resources for data traffic. In embodiments of the disclosure, PDCCH, EPDCCH are non-limiting examples of control channels and PDSCH and PUSCH are non-limiting examples of data channels. For PDSCH, same subframe scheduling is used where the PDCCH/EPDCCH and PDSCH occur in the same subframe. For PUSCH, cross-subframe scheduling is used where the PUSCH resources are located 4 subframes after the PDCCH/EPDCCH subframe.

In Rel-13 eMTC, MPDCCH is used to schedule PDSCH and PUSCH, where cross subframe scheduling is used for both PDSCH and PUSCH. If the last repetitive MPDCCH ends at subframe n, the PDSCH would start at subframe n+k, where k=1 if MPDCCH and PDSCH share the same narrowband and k=2 if the MPDCCH and PDSCH can have different narrowbands. In the case that PUSCH is scheduled, it will start at n+4 subframe, similar to the timing relationship used in LTE.

In both LTE and Rel-13 eMTC, the timing between the control channel (PDCCH, EPDCCH or MPDCCH) and the data channel (PDSCH and PUSCH) are fixed. However, in NB-IoT, it was recently agreed that the timing between the control channel NB-PDCCH and the data channel NB-PDSCH and NB-PUSCH are flexible and it is indicated in the Downlink Control Information (DCI). In embodiments of the disclosure, DCI is a non-limiting example of control information. It is envisaged that the time information may be provided in any appropriate control information. The NB-PDCCH would indicate the start of the NB-PDSCH in the downlink grant (where the downlink grant is carried in DCI). In embodiments of the disclosure, grant means scheduled resources information and is a term of art known to the skilled person.

Similarly, the NB-PDCCH would indicate the start of the NB-PUSCH in the uplink grant (where the uplink grant is carried in DCI). Due to the need for UE to complete decoding and processing of one channel before commencing decoding or encoding of another channel, it was agreed to have minimum time offsets between channels namely:

The start of NB-PUSCH transmission is 8 ms later than the end of its associated NB-PDCCH transmission The start of an NB-PDCCH search space is 4 ms after the end of the last NB-PDCCH search space The start of NB-PDSCH transmission is 4 ms later than the end of its associated NB-PDCCH transmission The start of UL Ack/Nack transmission is 12 ms later than the end of the corresponding NB-PDSCH transmission The start of DL Ack/Nack transmission is 3 ms later than the end of the corresponding NB-PUSCH transmission The inventors of the present disclosure have realised that flexible timing between the control and data channels can lead to collisions. Some of the collision scenarios are highlighted in FIGS. 5 to 8.

Referring to FIG. 5, a collision between two PUSCH carrying data is shown. Specifically, FIG. 5 shows two Narrow Band (NB hereinafter) PUSCH allocations to the same UE. NB-PDCCH 1 schedules NB-PUSCH 1 which occurs $T_1$ ms later (where, in accordance with the bullet points above, $T_1 \geq 8$ ms). NB-PDCCH 2 schedules NB-PUSCH 2 which occurs $T_2$ ms later ($T_2 \geq 8$ ms). Since $T_1$ and $T_2$ may be different, collision of NB-PUSCH 1 and NB-PUSCH 2 as shown in FIG. 5 may occur.

Referring to FIG. 6, a collision between two NB-PDSCH is shown. Specifically, FIG. 6 shows two NB-PDSCH allocations to the same UE. NB-PDCCH 1 schedules NB-PDSCH 1 which occurs $T_1$ ms later (where, in accordance with the bullet points above, $T_1 \geq 4$ ms). NB-PDCCH 2 schedules NB-PDSCH 2 which occurs $T_2$ ms later ($T_2 \geq 4$ ms). Since $T_1$ and $T_2$ may not be the same, collision of NB-PDSCH 1 and NB-PDSCH 2 as shown in FIG. 6 may occur.

Referring to FIG. 7, a collision between NB-PUSCH and NB-PDSCH is shown. Specifically, FIG. 7 shows an NB-PUSCH and an NB-PDSCH allocation to the same UE. NB-PDCCH 1 schedules NB-PUSCH 1 where UE starts to transmit NB-PUSCH 1 at $T_1$ ms (where, in accordance with the bullet points above, $T_1$ 8 ms) after the end of NB-PDCCH 1. NB-PDCCH 2 schedules NB-PDSCH 2 where NB-PDSCH 2 starts at $T_2$ ms (where, in accordance with the bullet points above, $T_2 \geq 4$ ms). It should be noted that the NB-IoT UE is HD-FDD (half-duplex frequency division duplex) and hence it is not possible for it to receive and transmit at the same time. Since $T_1$ and $T_2$ are flexible, collision between NB-PUSCH and NB-PDSCH may occur as shown in FIG. 7.

Referring to FIG. 8, a collision between an NB-PUSCH carrying Uplink Control Information (the case where the UCI consists of ACK/NACK is shown) and an NB-PUSCH carrying data is shown. Specifically, FIG. 8 shows two allocations by NB-PDCCH 1 and NB-PDCCH 2 at different times.

Firstly, NB-PDCCH 1 schedules NB-PDSCH 1 where the UE sends an acknowledgement (ACK/NACK) $T_1$ ms (where, in accordance with the bullets above, $T_1 \geq 12$ ms) after the reception of NB-PDSCH 1. During time $T_1$, the eNB transmits NB-PDCCH 2 to schedule NB-PUSCH 2 for the same UE, where the UE starts transmitting NB-PUSCH 2 at $T_2$ ms after the end of NB-PDCCH 2 reception. As shown in FIG. 8, collision between the ACK/NACK and NB-PUSCH 2 is possible.

In LTE, such collisions are handled by multiplexing (i.e. piggy backing) the ACK/NACK bits onto the PUSCH. However, due to repetition where the ACK/NACK and PUSCH can have different repetitions and start at different times, piggy backing onto PUSCH is not used in Rel-13 eMTC. Instead, the PUSCH carrying data is dropped. Here it is deemed that the ACK/NACK has higher priority than the NB-PUSCH data. However, in NB-IoT, the traffic is deemed to be uplink centric and there is a latency requirement that an uplink alarm (i.e. uplink message) needs to be received within 10 seconds and hence dropping the NB-PUSCH may not be suitable.

It is an aim of the present disclosure to reduce the likelihood of collisions.

In order to address this problem, a maximum (which may be predetermined) number of grants that the UE can receive and process (i.e. decoding of grant or NB-PDCCH and receiving/transmitting of the corresponding data channel) is imposed.

Figure 9:
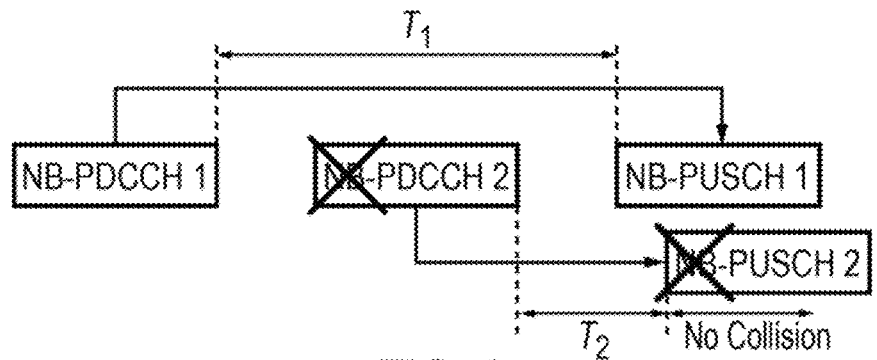
FIG. 9 describes a mechanism for avoiding the collision shown in FIG. 5 according to an embodiment of the disclosure.

Referring to FIG. 9, the mechanism for avoiding the collision shown in FIG. 5 is described. Whilst the UE is processing the grant (i.e. waiting for the NB-PUSCH which is one example of a data channel) from NB-PDCCH 1, the UE is not allowed to receive another UL grant during time $T_1$. Therefore, the UE will not monitor NB-PDCCH 2 for any UL grant. It will also not monitor for any UL grant whilst transmitting NB-PUSCH 1 (which is not allowed in HD-FDD). Hence the collision between NB-PUSCH 1 and NB-PUSCH 2 is avoided since NB-PUSCH 2 is not scheduled as shown in FIG. 9.

In its most basic form, in order to avoid a collision, the second control channel (in the non-limiting example, NB-PDCCH 2) is not monitored for the time period set in the DCI. That is to avoid the situation where the UE cannot process the number of data channels set by the time period (which, in embodiments, defines a collision), the second control channel is not monitored for the time period set in the DCI.

In embodiments, to allow the second control channel to receive ACK/NACK, it is possible for the UE to ignore control channels that include scheduling information (also referred to as scheduling commands) rather than necessarily all control channels.

In embodiments, the said grant refers to UL grant and the maximum number of grants is equal to the number of UL HARQ processes. For the NB-IoT scenario, the number of UL HARQ processes is one and hence the UE cannot receive any UL grant while it is processing an ongoing grant.

Figure 10:
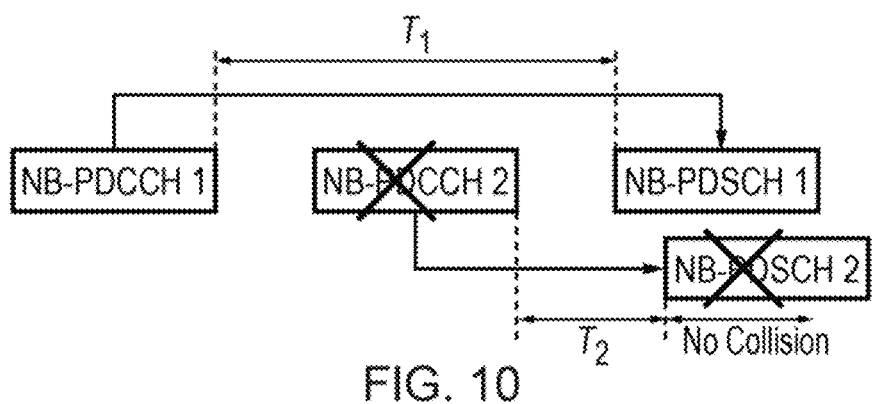
FIG. 10 describes a mechanism for avoiding the collision shown in FIG. 6 according to an embodiment of the disclosure.

In another embodiment, the said grant refers to DL grant and the maximum number of grants is equal to the number of DL HARQ processes. For the NB-IoT scenario, the number of DL HARQ processes is one and hence the UE cannot receive any DL grant while it is processing an ongoing DL grant. Using the example in FIG. 6, while the UE is processing the grant from NB-PDCCH 1, it is not allowed to receive another DL grant during time $T_1$ and hence it will not monitor NB-PDCCH 2 for any DL grant. It will also not monitor for any DL grant whilst receiving NB-PDSCH 1. Hence the collision between NB-PDSCH 1 and NB-PDSCH 2 is avoided since NB-PDSCH 2 is not scheduled as shown in FIG. 10.

Whilst the UE is not monitoring the control channel, it may go to sleep. In other words, the UE may go to sleep between the grant and the scheduled resources (for example, between NB-PDCCH1 and NB-PDSCH1). This reduces power consumption. The UE will wake at the expiration of the time period defined in the DCI.

Figure 11:
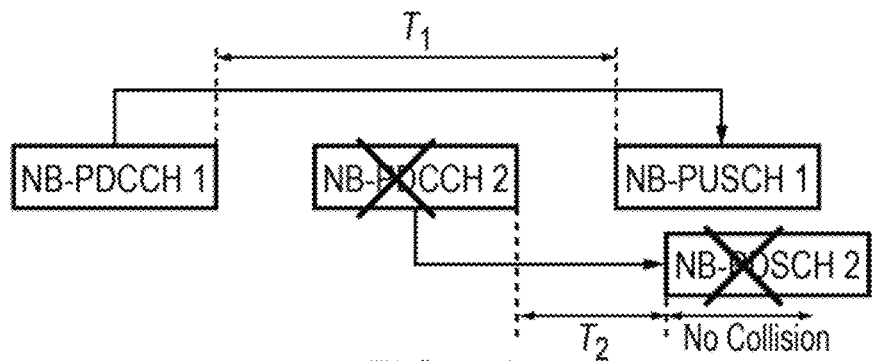
FIG. 11 describes a mechanism for avoiding the collision shown in FIG. 7 according to an embodiment of the disclosure.

In another embodiment, the maximum number of grants is less than the number of simultaneous duplexing of the UE. The grant refers to a grant that is in the opposite direction. In NB-IoT, the UE is Half-Duplex and hence the number of duplexing is one. Hence whilst the UE is processing a grant in one direction it cannot receive another grant in the opposite direction. Using the example collision in FIG. 7, NB-PDCCH 1 provides an UL grant and hence while processing this UL grant during time $T_1$ and receiving the NB-PDSCH 1, the UE is not allowed to receive a DL grant. Hence the UE will not monitor NB-PDCCH 2 for a DL grant. Hence, the collision between NB-PUSCH 1 and NB-PDSCH 2 is avoided as shown in FIG. 11. It should be appreciated that this applies for the scenario where NB-PDCCH 1 provides a DL grant and the UE avoids monitoring for an UL grant in NB-PDCCH 2.

Of course, the above only describes embodiments of the disclosure. The three mechanisms for avoiding collisions may be combined as would be appreciated. The skilled person will appreciate this and that the UE will not monitor any grant, whether it is downlink or uplink whilst processing an ongoing grant. In other words, the UE (which is one example of a terminal device) will not monitor the control channel during a time period between the control channel and the data channel defined by control information.

Of course, it is also envisaged that during this time, the eNB (which is an example of infrastructure equipment) will not transmit the data or control channel containing scheduling commands to the UE that is processing an ongoing grant, until after expiration of the time period. This is because an eNB would appreciate that there is no benefit in sending this data channel as the terminal device according to embodiments will ignore the data channel. This will save energy and will reduce network traffic.

Figure 12:
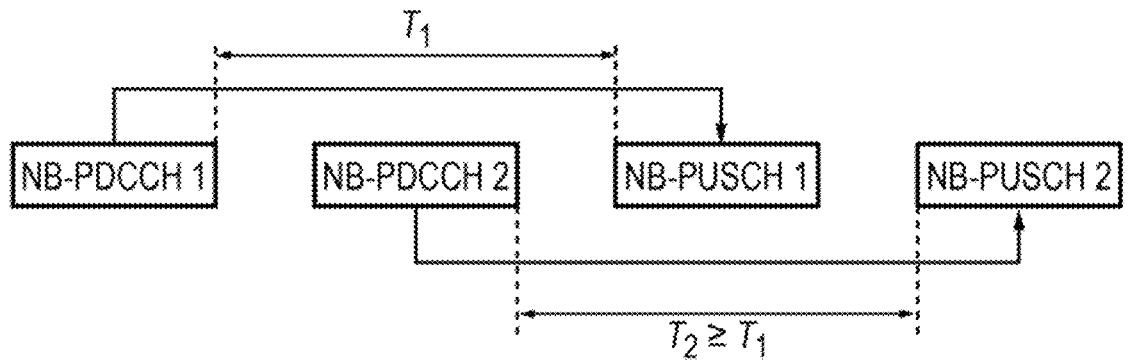
FIG. 12 shows the mechanism for avoiding the collision between NB-PUSCH 1 and NB-PUSCH 2 using another embodiment of the disclosure.

In another embodiment, the maximum number of grants is not considered but the start time of the subsequent (T2) transmission shall be at least equal or greater than the start timing of the previous transmission (T1). In this case, during T1 period, the UE will monitor NB-PDCCH2. If the UE receives scheduling commands such that T2 is not greater than or equal to T1, it ignores the scheduling command in NB-PDCCH2. These rules can be applied to the following cases:

1) The collision between NB-PUSCH 1 and NB-PUSCH 2 is avoided since NB-PUSCH 2 transmission is ensured after NB-PUSCH1 as shown in FIG. 12. In other words, by setting T2 to be greater than T1, where T2 applies to the later control channel, a collision between the two data channels (NB-PUSCH 1 and NB-PUSCH 2) can be avoided.

Figure 13:
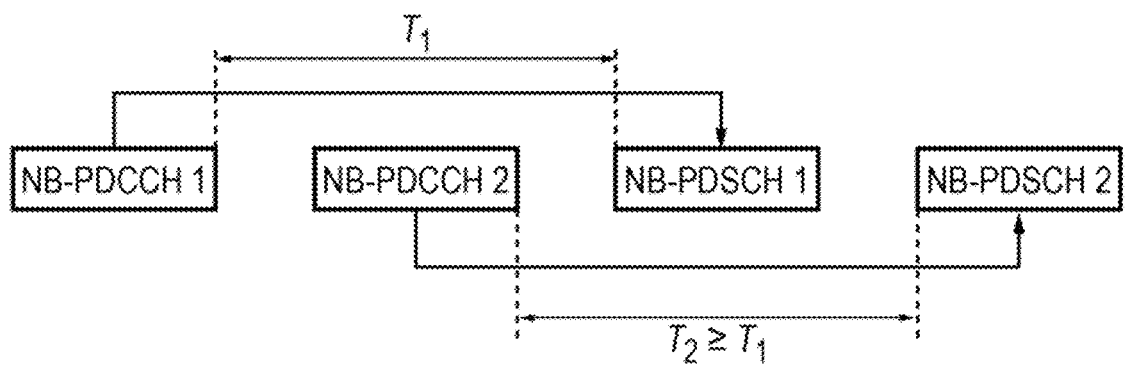
FIG. 13 shows the mechanism for avoiding the collision between two NB-PDSCH using embodiments of the disclosure.

2) The collision between NB-PDSCH 1 and NB-PDSCH 2 is avoided since NB-PDSCH 2 transmission is ensured after NB-PDSCH1 as shown in FIG. 13. Note that FIG. 13 is a downlink version of FIG. 12 and so the discussion of FIG. 12 is applicable to FIG. 13.

Figure 14:
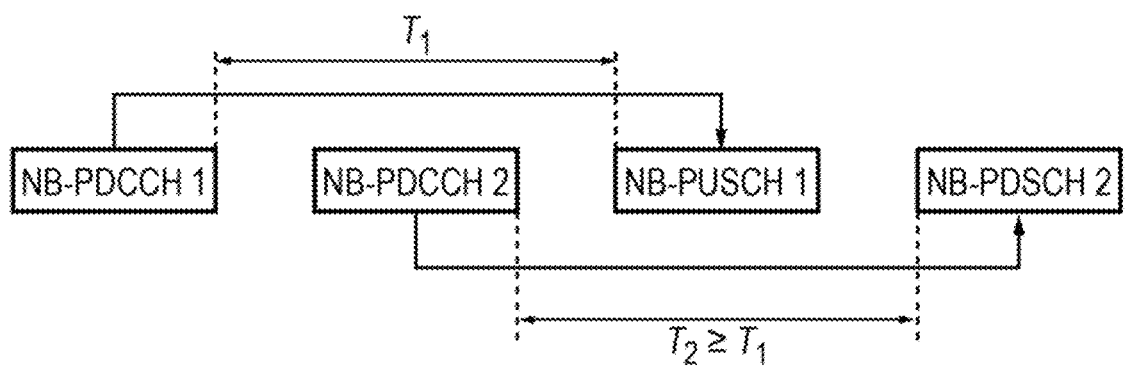
FIG. 14 shows the mechanism for avoiding the collision between NB-PUSCH and NB-PDSCH using embodiments of the disclosure.

3) The collision between NB-PUSCH 1 and NB-PDSCH 2 is avoided since NB-PDSCH 2 transmission is ensured after NB-PUSCH 1 as shown in FIG. 14. Again, FIG. 14 includes a combination of uplink data channels and downlink data channels. Therefore the discussion in respect of FIGS. 12 and 13 applies equally to FIG. 14.

In the prior art, when a collision does occur, normally, the data channel that is dropped is the data channel that starts earlier.

Figure 15:
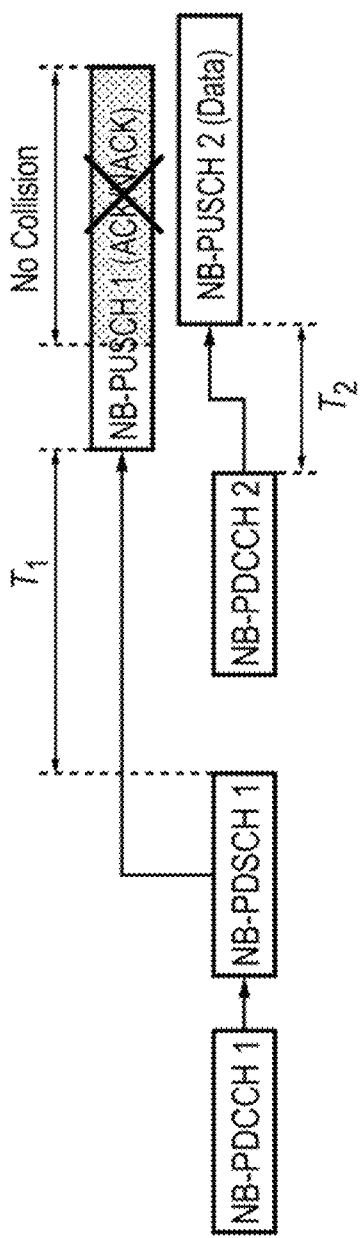
FIG. 15 shows the mechanism for avoiding the collision between NB-PUSCH carrying ACK/NACK and NB-PUSCH using a different embodiment of the disclosure.

In an embodiment, when a collision occurs, instead of the data channel that starts earlier being dropped, the data channel that is scheduled earlier is stopped. This embodiment recognises that the eNB is aware of its own scheduling and therefore if the eNB schedules a later channel it should overwrite a previous one. Using the collision example in FIG. 8, the eNB uses NB-PDCCH 1 to schedule the UE with NB-PDSCH 1 which results in an acknowledgement (ACK/NACK) carried by NB-PUSCH 1. It should be noted that NB-PUSCH 1 carrying this acknowledgement is likely scheduled by NB-PDCCH 1. NB-PDCCH 2 comes later (i.e. is a subsequent control channel) and schedules NB-PUSCH 2. Hence in this case, as NB-PUSCH1 is scheduled by the earlier control channel, the UE will stop the earlier scheduled message, i.e. NB-PUSCH 1 as shown in FIG. 15. The UE will transmit NB-PUSCH 2.

The UE can stop all of NB-PUSCH 1 (i.e. so none of NB-PUSCH 1 is transmitted) or can stop the portion after collision starts or even stop transmitting NB-PUSCH 1 and then resume transmission of NB-PUSCH 1 at a later time. For example, the resumption can occur after the UE has completed transmission of NB-PUSCH 2. This resumption may use the same resources as the stopped transmission or may use different resources.

Figure 16:
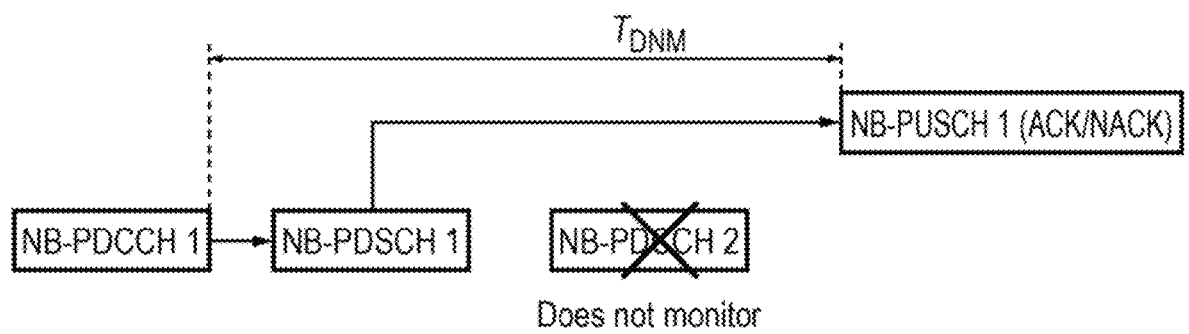
FIG. 16 shows an alternative to the mechanism of FIG. 15.

As an alternative solution to the issue explained in FIG. 8, rather than the UE determine which data channel was scheduled later in order to resolve the potential collision as explained in FIG. 15, in embodiments, the UE does not need to do this. This is shown in FIG. 16. If NB-PDCCH1 allocates NB-PDSCH1, then the UE does not monitor the NB-PDCCH (i.e. the UE does not monitor for DL-grants or UL-grants) for the time period ($T_{DNM}$) between the NB-PDCCH1 and the transmission of the ACK/NACK (NB-PUSCH1).

If NB-PDCCH1 allocates NB-PUSCH, then the UE does not monitor for NB-PDCCH between NB-PDCCH and NB-PUSCH, but can monitor after that NB-PUSCH. This rule is applied because the UE has to monitor NB-PDCCH after it transmits NB-PUSCH (since the NB-PDCCH will carry the ACK/NACK for the NB-PUSCH, the UE has to monitor for NB-PDCCH).

So, the UE does not need to monitor for NB-PDCCH within time $T_{DNM}$ (i.e. between end of NB-PDCCH1) till the start of NB-PUSCH carrying ACK/NACK (or end of NB-PUSCH carrying ACK/NACK) if the data channel scheduled by NB-PDCCH1 is for downlink (i.e. NB-PDSCH).

Additionally, if NB-PDCCH1 schedules a NB-PUSCH instead of a NB-PDSCH (i.e. NB-PUSCH 1 instead of NB-PDSCH 1), then the UE is allowed to monitor another NB-PDCCH after the transmission of NB-PUSCH.

As the UE does not need to determine which data channel was scheduled later in order to resolve the potential collision (as in the case of FIG. 15), this alternative solution is simpler than that shown in FIG. 15.

Figure 17:
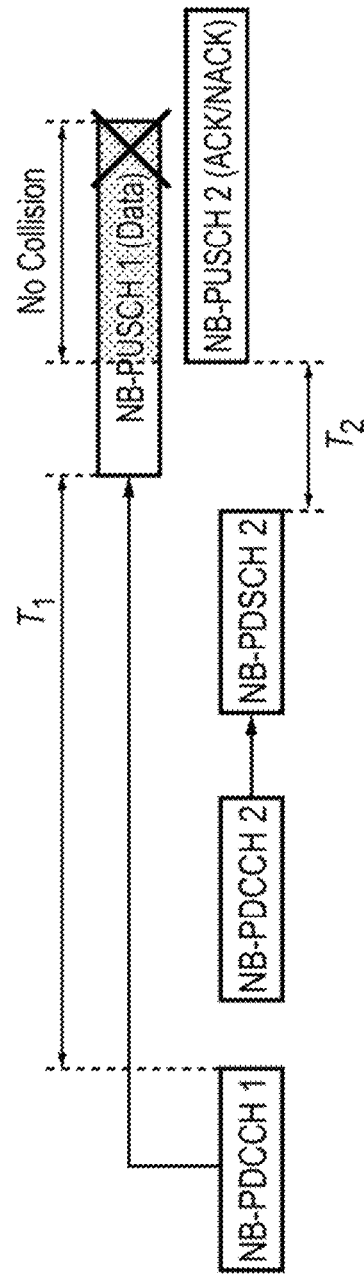
FIG. 17 shows the mechanism for avoiding the collision between NB-PUSCH1 carrying data and NB-PUSCH2 carrying ACK/NACK using embodiments of the disclosure.

It should be appreciated in FIG. 15 that if the NB-PUSCH carrying data is scheduled first, then it will be stopped. A further example of this embodiment is shown in FIG. 17 where NB-PDCCH 1 schedules NB-PUSCH 1 carrying data whilst NB-PDCCH 2 schedules NB-PDSCH 2 which leads to NB-PUSCH 2 carrying the acknowledgement being transmitted. Since NB-PUSCH 2 is scheduled later, NB-PUSCH 1 carrying data is stopped.

Figure 18:
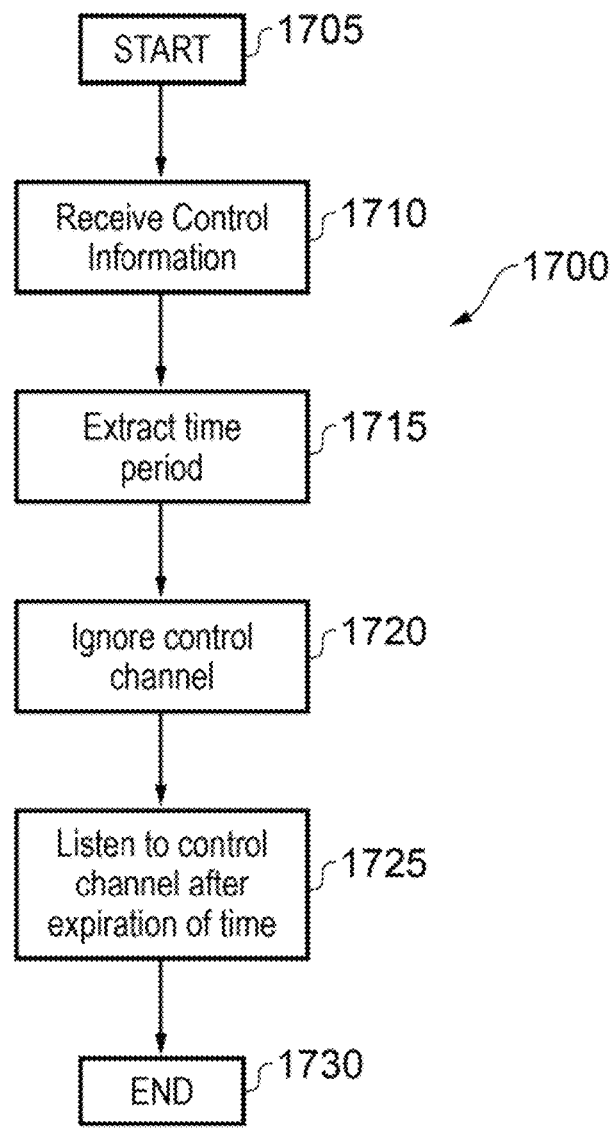
FIG. 18 shows a flow chart explaining the process of receiving control channels in a terminal device according to embodiments.

Referring to FIG. 18, a flow chart 1700 explaining the process in a terminal device according to embodiments is shown. The process starts at step 1705. The UE receives control information in step 1710. The time period between the control channel and the data channel is extracted in step 1715. The UE ignores other control channels in step 1720. The UE then listens to the control channels again after expiration of the time period in step 1725. The process ends in step 1730.

Figure 19:
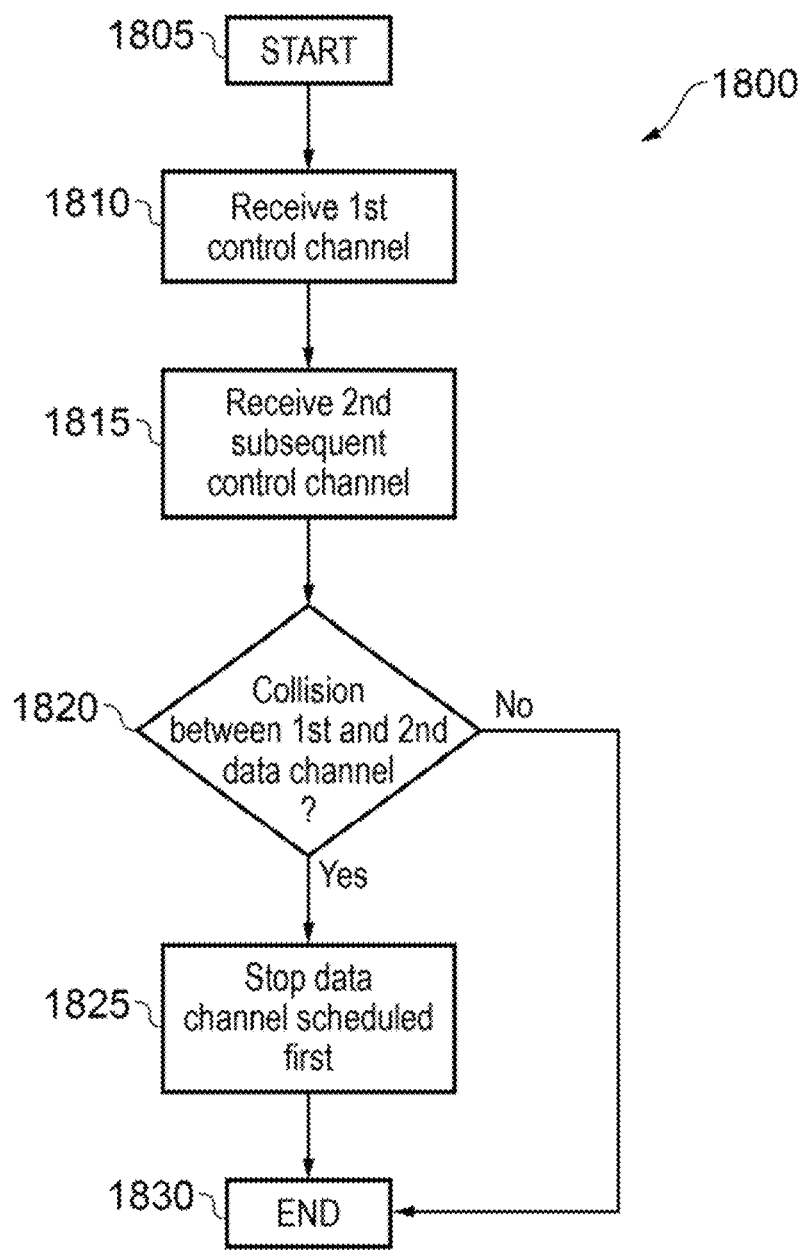
FIG. 19 shows a flow chart explaining the process of receiving control channels and receiving/transmitting other channels in a terminal device according to embodiments.

Referring to FIG. 19, a flow chart 1800 explaining the process in a terminal device according to embodiments is shown. The process starts at step 1805. The UE receives a first control channel in step 1810. The UE then receives a second, subsequent, control channel in step 1815. The UE then determines whether a collision will occur between the first and second data channel in step 1820. If no collision occurs, the process ends at step 1830 as the "no" path is followed.

If a collision will occur, the "yes" path is followed and the data channel first scheduled is stopped in step 1825. The process then ends in step 1830.

Various features of embodiments of the present technique are defined by the following numbered clauses:

1. A terminal device for use with a wireless telecommunications network, the terminal device comprising:
transceiver circuitry configured to receive data from the wireless telecommunications network, and a controller configured: to control the transceiver circuitry to receive control information, a control channel and a data channel wherein, the control information defines the period of time between the control channel and the data channel, and to ignore a subsequent control channel received during the period of time following the control channel 2. A terminal device according to clause 1, wherein the controller is configured to ignore the subsequent control channel received during the period of time following the control channel if this leads to the number of grants being greater than a predetermined number.

3. A terminal device according to clause 2, wherein the predetermined number is determined to be equal to the number of Hybrid Automatic Repeat Request processes.

4. A terminal device according to clause 2 or 3, wherein the predetermined number is 1.

5. A terminal device according to clause 2, 3 or 4, wherein the predetermined number is equal to the number of simultaneous duplexing within the terminal device.

6. A terminal device for use with a wireless telecommunications network, the terminal device comprising:
transceiver circuitry configured to receive data from the wireless telecommunications network, and a controller configured: to control the transceiver circuitry to receive control information, a control channel and a data channel wherein, the control information defines the period of time between the control channel and the data channel, and to ignore a subsequent control channel containing scheduling commands received during the period of time following the control channel 7. A terminal device for use with a wireless telecommunications network, the terminal device comprising:
transceiver circuitry configured to receive data from the wireless telecommunications network, and a controller configured: to control the transceiver circuitry to receive control information, a first control channel and a second control channel and a first data channel and a second data channel wherein, the control information defining a first period of time between the first control channel and the first data channel and a second period of time between the second control channel and the second data channel, wherein when the second period of time is not greater than or equal to the first period of time, the transceiver circuitry is configured to ignore the second control channel 8. A terminal device for use with a wireless telecommunications network, the terminal device comprising:
transceiver circuitry configured to receive data from and provide data to the wireless telecommunications network, and a controller configured: to control the transceiver circuitry to receive a downlink control channel scheduling downlink data and an uplink data channel containing an acknowledgment indication, wherein the controller is configured to not monitor the downlink control channel during the period of time between the received downlink channel and the uplink data channel 9. A terminal device for use with a wireless telecommunications network, the terminal device comprising:
transceiver circuitry configured to receive data from the wireless telecommunications network, and a controller configured: to control the transceiver circuitry to receive control information, a first control channel and a second control channel received after the first control channel and a first data channel associated with the first control channel and a second data channel associated with the second control channel, wherein, in the event of a collision between the first data channel and the second data channel, transmission or reception of the first data channel is stopped.

10. A terminal device according to clause 9, wherein the controller is configured to resume transmission or reception of the first data channel after complete reception of the second data channel 11. A terminal device according to any preceding clause 1, wherein the terminal device is a Narrow Band Internet of Things (NB-IoT) terminal device.

12. Infrastructure equipment for use with a wireless telecommunications network, the infrastructure equipment comprising a transceiver configured to transmit data over the wireless telecommunications network to a terminal device of any of clause 1 to 11, and a controller configured: to control the transceiver circuitry to transmit control information, a control channel and a data channel wherein, the control information defines the period of time between the control channel and the data channel, and to not transmit a subsequent control channel to the terminal device during the period of time following the control channel 13. Infrastructure equipment according to clause 12, wherein the controller is configured to not transmit the subsequent control channel received during the period of time following the control channel if this leads to the number of grants being greater than a predetermined number.

14. Infrastructure Equipment according to clause 13, wherein the predetermined number is determined to be equal to the number of Hybrid Automatic Repeat Request processes.

15. Infrastructure equipment according to clause 13 or 14, wherein the predetermined number is 1.

16. Infrastructure equipment according to clause 13, 14 or 15, wherein the predetermined number is equal to the number of simultaneous duplexing within the terminal device.

17. Infrastructure equipment for use with a wireless telecommunications network, the infrastructure equipment comprising a transceiver configured to transmit data over the wireless telecommunications network to a terminal device of any of clause 1 to 11, and a controller configured: to control the transceiver circuitry to transmit control information, a control channel and a data channel wherein, the control information defines the period of time between the control channel and the data channel, and to not transmit a subsequent control channel containing scheduling commands to the terminal device during the period of time following the control channel 18. Infrastructure equipment for use with a wireless telecommunications network, the infrastructure equipment comprising:
transceiver circuitry configured to transmit data over the wireless telecommunications network to a terminal device according to clause 8, and a controller configured: to control the transceiver circuitry to transmit control information, a first control channel and a second control channel and a first data channel and a second data channel wherein, the control information defining a first period of time between the first control channel and the first data channel and a second period of time between the second control channel and the second data channel, wherein the second period of time is larger than the first period of time, such that the second data channel is received after the first data channel 19. Infrastructure equipment for use with a wireless telecommunications network, the infrastructure equipment comprising:
transceiver circuitry configured to transmit data over the wireless telecommunications network to a terminal device according to clause 9, and a controller configured: to control the transceiver circuitry to transmit control information, a first control channel and a second control channel received after the first control channel and a first data channel associated with the first control channel and a second data channel associated with the second control channel, wherein, in the event of a collision between the first data channel and the second data channel, transmission or reception of the first data channel is stopped.

20. Infrastructure equipment according to clause 19, wherein the controller is configured to resume transmission or reception of the first data channel after complete transmission of the second data channel 21. Infrastructure equipment according to clause 18 or 19, wherein the infrastructure equipment is a Narrow Band Internet of Things (NB-IoT) infrastructure equipment and the terminal device is an NB-IoT terminal device.

22. A method of controlling a terminal device for use with a wireless telecommunications network, the method comprising: receiving data from the wireless telecommunications network, receiving control information, a control channel and a data channel wherein, the control information defines the period of time between the control channel and the data channel, and to ignore a subsequent control channel received during the period of time following the control channel 23. A method of controlling a terminal device for use with a wireless telecommunications network, the method comprising: receiving data from the wireless telecommunications network, and receiving control information, a first control channel and a second control channel and a first data channel and a second data channel wherein, the control information defining a first period of time between the first control channel and the first data channel and a second period of time between the second control channel and the second data channel, wherein when the second period of time is not greater than or equal to the first period of time, the transceiver circuitry is configured to ignore the second control channel 24. A method of controlling a terminal device for use with a wireless telecommunications network, the method comprising receiving data from and provide data to the wireless telecommunications network, and receiving a downlink control channel scheduling downlink data and an uplink data channel containing an acknowledgment indication, and to not monitor the downlink control channel during the period of time between the received downlink channel and the uplink data channel 25. A method of controlling a terminal device for use with a wireless telecommunications network, the method comprising: receiving data from the wireless telecommunications network, and receiving control information, a first control channel and a second control channel received after the first control channel and a first data channel associated with the first control channel and a second data channel associated with the second control channel, wherein, in the event of a collision between the first data channel and the second data channel, transmission or reception of the first data channel is stopped.

26. A method of controlling a terminal device for use with a wireless telecommunications network, the method comprising: receiving data from the wireless telecommunications network, receiving control information, a control channel and a data channel wherein, the control information defines the period of time between the control channel and the data channel, and to ignore a subsequent control channel containing scheduling commands received during the period of time following the control channel 27. A method of controlling infrastructure equipment for use with a wireless telecommunications network, the method comprising: transmitting data over the wireless telecommunications network to a terminal device of any one of clause 1 to 11, and transmitting control information, a control channel and a data channel wherein, the control information defines the period of time between the control channel and the data channel, and to not transmit a subsequent control channel to the terminal device during the period of time following the control channel 28. A method of controlling infrastructure equipment for use with a wireless telecommunications network, the method comprising: transmitting data over the wireless telecommunications network to a terminal device according to clause 8, and transmitting control information, a first control channel and a second control channel and a first data channel and a second data channel wherein, the control information defining a first period of time between the first control channel and the first data channel and a second period of time between the second control channel and the second data channel, wherein the second period of time is larger than the first period of time, such that the second data channel is received after the first data channel 29. A method of controlling infrastructure equipment for use with a wireless telecommunications network, the method comprising: transmitting data over the wireless telecommunications network to a terminal device according to clause 9, and transmitting control information, a first control channel and a second control transmitted after the first control channel and a first data channel associated with the first control channel and a second data channel associated with the second control channel, wherein, in the event of a collision between the first data channel and the second data channel, transmission or reception of the first data channel is stopped.

30. Integrated circuitry for a terminal device for use with a wireless telecommunications network, the integrated circuitry comprising a transceiver element configured to receive data from the wireless telecommunications network, and a controller configured: to control the transceiver circuitry to receive control information, a control channel and a data channel wherein, the control information defines the period of time between the control channel and the data channel, and to ignore a subsequent control channel received during the period of time following the control channel 31. Integrated circuitry for a terminal device for use with a wireless telecommunications network, the integrated circuitry comprising a transceiver element configured to receive data from the wireless telecommunications network, and a controller element configured: to control the transceiver circuitry to receive control information, a first control channel and a second control channel and a first data channel and a second data channel wherein, the control information defining a first period of time between the first control channel and the first data channel and a second period of time between the second control channel and the second data channel, wherein when the second period of time is not greater than or equal to the first period of time, the transceiver circuitry is configured to ignore the second control channel 32. Integrated circuitry for a terminal device for use with a wireless telecommunications network, the integrated circuitry comprising a transceiver element configured to receive data from the wireless telecommunications network, and a controller element configured: to control the transceiver circuitry to receive control information, a first control channel and a second control channel received after the first control channel and a first data channel associated with the first control channel and a second data channel associated with the second control channel, wherein, in the event of a collision between the reception of the first data channel and the second data channel, reception or transmission of the first data channel is stopped 33. Integrated circuitry for a terminal device for use with a wireless telecommunications network, the integrated circuitry comprising a transceiver element configured to receive data from the wireless telecommunications network, and a controller configured: to control the transceiver circuitry to receive control information, a control channel and a data channel wherein, the control information defines the period of time between the control channel and the data channel, and to ignore a subsequent control channel containing scheduling information received during the period of time following the control channel 34. Integrated circuitry for infrastructure equipment for use with a wireless telecommunications network, the integrated circuitry comprising a transceiver element configured to transmit data over the wireless telecommunications network to a terminal device of clause 1 to 11, and a controller element configured: to control the transceiver circuitry to transmit control information, a control channel and a data channel wherein, the control information defines the period of time between the control channel and the data channel, and to not transmit a subsequent control channel to the terminal device during the period of time following the control channel 35. Integrated circuitry for infrastructure equipment for use with a wireless telecommunications network, the integrated circuitry comprising a transceiver element configured to transmit data over the wireless telecommunications network to a terminal device according to clause 8, and a controller element configured: to control the transceiver circuitry to transmit control information, a first control channel and a second control channel and a first data channel and a second data channel wherein, the control information defining a first period of time between the first control channel and the first data channel and a second period of time between the second control channel and the second data channel, wherein the second period of time is larger than the first period of time, such that the second data channel is received after the first data channel 36. Integrated circuitry for infrastructure equipment for use with a wireless telecommunications network, the integrated circuitry comprising a transceiver element configured to transmit data over the wireless telecommunications network to a terminal device according to clause 9, and a controller element configured: to control the transceiver circuitry to transmit control information, a first control channel and a second control channel transmitted after the first control channel and a first data channel associated with the first control channel and a second data channel associated with the second control channel, wherein, in the event of a collision between the transmission of the first data channel and the second data channel, transmission or reception of the first data channel is stopped.

37. Integrated circuitry for infrastructure equipment for use with a wireless telecommunications network, the integrated circuitry comprising a transceiver element configured to transmit data over the wireless telecommunications network to a terminal device of clause 1 to 11, and a controller element configured: to control the transceiver circuitry to transmit control information, a control channel and a data channel wherein, the control information defines the period of time between the control channel and the data channel, and to not transmit a subsequent control channel containing scheduling information to the terminal device during the period of time following the control channel Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals DMRS 307 and sounding reference signals SRS 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69
[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN 1#83

The invention claimed is:

1. A method, comprising:
receiving, by a terminal device, data from a wireless telecommunications network;
receiving control information that defines a period of time between a control channel and a data channel;
incrementing a number of grants in response to reception of the control channel; and
ignoring a subsequent control channel received during the period of time following the control channel in a case that incrementing the number of grants, in response to the subsequent control channel, would render the number of grants greater than a predetermined number.

2. A method, comprising:
receiving, by a terminal device, data from a wireless telecommunications network;
receiving control information that defines a first period of time between a first control channel and a first data channel and a second period of time between a second control channel and a second data channel;
ignoring the second control channel in a case that the second period of time is not greater than or equal to the first period of time; and
processing the second control channel after processing the first control channel in a case that the second period of time is greater than or equal to the first period of time.

3. Integrated circuitry for infrastructure equipment, the integrated circuitry comprising:
transceiver circuitry configured to transmit data over a wireless telecommunications network to a terminal device; and
control circuitry configured to:
control the transceiver circuitry to transmit control information that defines a period of time between a control channel and a data channel;
increment a number of grants in response to receiving the control channel; and
not transmit a subsequent control channel to the terminal device during the period of time following the control channel in a case that incrementing the number of grants, in response to the subsequent control channel, would render the number of grants greater than a predetermined number.

4. The method according to claim 1, wherein the predetermined number is equal to a number of Hybrid Automatic Repeat Request processes.

5. The method according to claim 1, wherein the predetermined number is 1.

6. The method according to claim 1, wherein the terminal device is a Narrow Band Internet of Things (NB-IOT) terminal device.

7. The method according to claim 1, wherein the predetermined number is equal to a number of simultaneous duplexing directions of communication within the terminal device.

8. The method according to claim 2, wherein the ignoring is performed in a case that incrementing a number of grants, in response to the subsequent control channel, renders the number of grants greater than a predetermined number.

9. The method according to claim 8, wherein the predetermined number is equal to a number of Hybrid Automatic Repeat Request processes.

10. The method according to claim 8, wherein the predetermined number is 1.

11. The method according to claim 2, wherein the terminal device is a Narrow Band Internet of Things (NB-IOT) terminal device.

12. The method according to claim 8, wherein the predetermined number is equal to the number of simultaneous directions of communication within the terminal device.

13. The method according to claim 2, further comprising resume receiving the first data channel after completing transmission or reception of the second data channel.

14. The method according to claim 2, further comprising stopping transmission or reception of the first data channel in a case that a collision between the first data channel and the second data channel is detected.

15. The integrated circuitry according to claim 3, wherein the predetermined number is equal to a number of Hybrid Automatic Repeat Request processes.

16. The integrated circuitry according to claim 3, wherein the predetermined number is 1.

17. The integrated circuitry according to claim 3, wherein the terminal device is a Narrow Band Internet of Things (NB-IOT) terminal device.

18. The integrated circuitry according to claim 3, wherein the predetermined number is equal to the number of directions of communication duplexing within the terminal device.

* * * * *